United States Patent
Singer et al.

(10) Patent No.: US 10,634,771 B2
(45) Date of Patent: Apr. 28, 2020

(54) LASER SCANNER

(71) Applicant: LEICA GEOSYSTEMS AG, Heerbrugg (CH)

(72) Inventors: Julien Singer, Altstätten (CH); Lukas Heinzle, Dornbirn (AT); Jochen Scheja, Heerbrugg (CH); Simon Mark, Thal (CH); Jürg Hinderling, Marbach (CH); Burkhard Böckem, Jonen AG (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 416 days.

(21) Appl. No.: 15/473,497

(22) Filed: Mar. 29, 2017

(65) Prior Publication Data
US 2017/0285147 A1  Oct. 5, 2017

(30) Foreign Application Priority Data

Mar. 29, 2016 (EP) .................................. 16162714

(51) Int. Cl.
| | | |
|---|---|---|
| *G01C 3/08* | (2006.01) | |
| *G01S 7/481* | (2006.01) | |
| *G01S 17/42* | (2006.01) | |
| *G01S 17/89* | (2020.01) | |
| *G05D 1/00* | (2006.01) | |
| *G05D 1/02* | (2020.01) | |

(52) U.S. Cl.
CPC ............ *G01S 7/4817* (2013.01); *G01S 17/42* (2013.01); *G01S 17/89* (2013.01); *G05D 1/0088* (2013.01); *G05D 1/0236* (2013.01)

(58) Field of Classification Search
CPC ........ G01S 17/42; G01S 17/89; G01S 7/4817; G05D 1/0236; G05D 1/0088
See application file for complete search history.

(56) References Cited

U.S. PATENT DOCUMENTS

| | | | | |
|---|---|---|---|---|
| 4,854,692 A | * | 8/1989 | Kobayashi | ........... A61B 3/1025 351/221 |
| 7,969,558 B2 | * | 6/2011 | Hall | ...................... G01S 7/4813 356/5.01 |
| 2006/0103927 A1 | * | 5/2006 | Samukawa | ............. G01S 17/42 359/436 |
| 2010/0020306 A1 | | 1/2010 | Hall | |
| 2010/0106356 A1 | | 4/2010 | Trepagnier et al. | |

(Continued)

FOREIGN PATENT DOCUMENTS

EP        2706377 A1    3/2014

OTHER PUBLICATIONS

Velodyne: "User's Manual and Programming Guide HDL-64E S2 and S2.1", Sep. 10, 2015, retrieved from the internet on Aug. 29, 2017.

*Primary Examiner* — Samantha K Abraham

(74) *Attorney, Agent, or Firm* — Maschoff Brennan

(57) ABSTRACT

A laser scanner device adapted to be mounted to a vehicle, the device comprising a LIDAR module, the LIDAR module comprising at least one laser source, characterized by a horizontal field of view of at least 60°, an instantaneous vertical field of view of at least ±2°, a scan resolution of at least one point per 0.8° in horizontal and vertical direction, and a frame rate of at least 10 Hz for scanning at least the entire horizontal and instantaneous vertical field of view with said scan resolution.

13 Claims, 5 Drawing Sheets

(56) References Cited

U.S. PATENT DOCUMENTS

2015/0009485 A1* 1/2015 Mheen .................... G01S 17/87
356/4.01
2016/0071416 A1 3/2016 Kim et al.

* cited by examiner

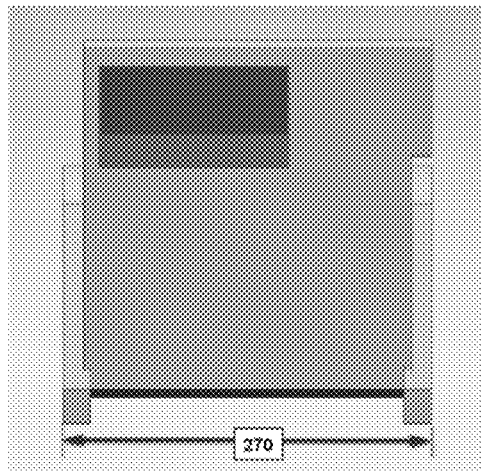 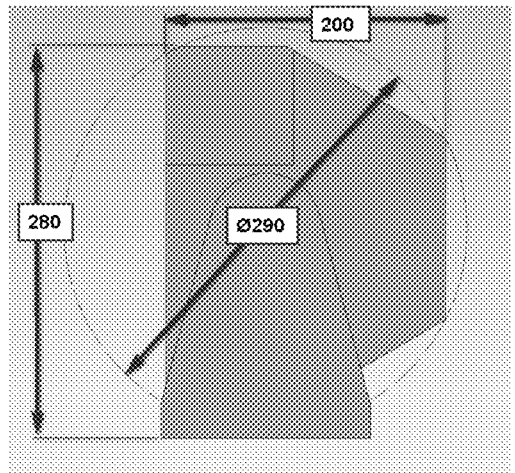
Fig. 3a  Fig. 3b
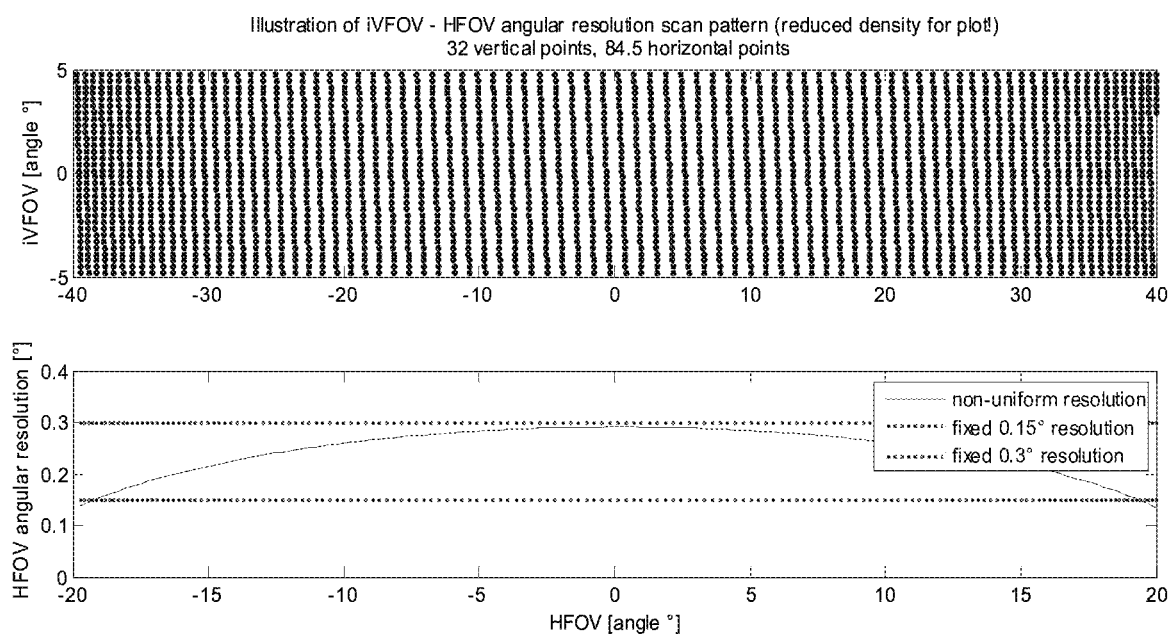
Fig. 4

| Component | Options |
|---|---|
| HFOV beam steering | rotating mirror, galvano (direct drive), galvano (resonace), MEMS, ... <br> Uniform, non-uniform, non-uniform, non-uniform |
| iVOF beam steering | polygon (reflective, transparent), mirror, MEMS, phased array (optical), ... |
| VFOV beam steering | tilt mechanism of system, beam steering (mechanical), beam steering (solid state), ... |
| Receiver | fixed receiver with 32 detectors, fixed receiver with 64 detectors, rotating receiver with 1 detector |
| Laser source | spatial single-mode laser diode, spatial multimode laserdiode, fiberlaser |
| Laser trigger | constant, adaptive (for uniform point grid) |
| Number of lasers | 1, 2, 2 (means 1 laser with 1x2 fibersplitter) |
| Receiver optics aperture | circular 41mm, circular 31mm, circular 21mm, rectangular 25mmx30mm |
| Receiver frontend | freespace, freespace, freespace, V-groove fiber coupler <br> single detectors, detector array on ceramic, monolithic detector array, |
| WFD platform | P40-WFD system, P40-WFD with enhanced dynamic range, dual P40-WFD, next generation WFD |
| TOF concept | RX start/stop fiber, TX start/stop-fiber, stop only (eg. with NADIR target) |

Fig. 5

| Component | Options |
|---|---|
| HFOV beam steering | rotating mirror, galvano (direct drive), galvano (resonace), MEMS, ... <br> Uniform, non-uniform, non-uniform, non-uniform |
| iVOF beam steering | polygon (reflective, transparent), mirror, MEMS, phased array (optical), ... |
| VFOV beam steering | tilt mechanism of system, beam steering (mechanical), beam steering (solid state), ... |
| Receiver | fixed receiver with 32 detectors, fixed receiver with 64 detectors, rotating receiver with 1 detector |
| Laser source | spatial single-mode laser diode, spatial multimode laserdiode, fiberlaser |
| Laser trigger | constant, adaptive (for uniform point grid) |
| Number of lasers | 1, 2, 2 (means 1 laser with 1x2 fibersplitter) |
| Receiver optics aperture | circular 41mm, circular 31mm, circular 21mm, rectangular 25mmx30mm |
| Receiver frontend | freespace, freespace, freespace, V-groove fiber <br> single detectors, detector array on ceramic, monolithic detector array, coupler |
| WFD platform | P40-WFD system, P40-WFD with enhanced dynamic range, dual P40-WFD, next generation WFD |
| TOF concept | RX start/stop fiber, TX start/stop-fiber, stop only (eg. with NADIR target as reference) |

| Parameter | Value |
|---|---|
| HFOV | at least 60°, in particular 70°, more particular 80° |
| iVFOV | at least ± 2°, in particular ± 3°, more particular ± 5°, especially ± 4.8° |
| resolution HFOV | at least 0.8°, in particular at least 0.3°, more particular 0.15° |
| resolution iVFOV | at least 0.8°, in particular at least 0.3°, more particular 0.15° |
| frame rate | 10Hz, in particular 20Hz, more particular 25Hz |
| maximum range (ambiguity) | at least 100m, in particular 150m, more particular 200m |
| size | 250x250x200mm |
| VFOV tilt range | at least ± 15, in particular ± 25° |
| tilt speed VFOV | e.g. 34ms/° |
| minium range | 3m, in particular 1m |
| range accuracy | 2cm to 5cm |
| range precision | 1.7cm (1σ, 200m, 10%) |
| Laser spotsize | 1.2mrad (1/e² diameter, full angle) |
| angular accuracy | < 1.31mrad |
| angular resolution | 0.89mrad (1σ) |

LASER SCANNER

FIELD OF THE INVENTION

The present invention pertains to a laser scanner device having a LIDAR (light detection and ranging) module working based on TOF-WFD (time-of-flight waveform digitizing).

BACKGROUND

LIDAR modules working based on TOF-WFD are well known in the art, and implemented e. g. within the Scan-Stations P20, P30 and P40 of Leica Geosystems.

Such LIDAR modules based on TOF-WFD technology can be equipped with lasers of diffraction limited beam divergence, and the receiving unit with at least one avalanche photodiode.

For running autonomous cars, it is preferred to have the roads be thoroughly mapped in advance. This can be done by special cars that have some kind of scanner device to scan and map the respective area.

For use on such a car for mapping the road, the LIDAR module has special requirements with respect to the scanning field-of-view (FOV) combined with a high frame rate. The horizontal field-of-view (HFOV) should be about 80°, whereas the vertical field-of-view (VFOV) can be considerably smaller (about ±25°. An instantaneous vertical field-of-view (iVFOV) needs only to be about ±5°. The frame rate for scanning this FOV should be at least 25 Hz. To adjust for this special request, new components and technology platforms are necessary.

BRIEF DESCRIPTION

Some embodiments of the present invention to provide an improved LIDAR scanner device.

Some embodiments provide such a device which fulfils the requirements stated above.

Some embodiments provide such a LIDAR scanner device that is useable in an autonomous car or similar vehicle.

According to the invention, a laser scanner device adapted to be mounted to a vehicle comprises a LIDAR module, in particular working based on emitted laser pulses and time-of-flight-measurement-principle, more particular using the technology of waveform digitizing, the LIDAR module comprising at least one laser source. The device has a horizontal field of view of at least 60°, an instantaneous vertical field of view of at least ±2°, a scan resolution of at least one point per 0.8° in horizontal and vertical direction, and a frame rate of at least 10 Hz for scanning at least the entire horizontal and instantaneous vertical field of view with said scan resolution.

In one embodiment, the device comprises a rotating mirror for steering a scanning beam horizontally in a uniform manner.

In another embodiment, the device comprises a galvano for steering a scanning beam horizontally in a non-uniform manner.

According to yet another embodiment, for steering the scanning beam vertically in the instantaneous vertical field of view, the device comprises a polygon, a mirror and/or MEMS.

In one embodiment, the device comprises a tilt mechanism for tilting the device to achieve an overall vertical field of view of at least ±25°.

In one embodiment, the device comprises a housing which encompasses the at least one laser module and all beam steering elements.

In one embodiment, the housing is suspended tiltably, particularly by means of a tilt mechanism that is adapted to tilt the housing to achieve an overall vertical field of view of at least ±25°.

In one embodiment, the device comprises a fixed receiver having at least 32 detectors, in particular at least 64 detectors.

In one embodiment, the device comprises a uniform scan resolution of at least 0.15°.

In one embodiment, the device comprises a non-uniform scan resolution, particularly of between 0.15° and 0.3°, particularly wherein a point density of the non-uniform scan increases towards the edges of the field of view.

In one embodiment, the device comprises a rectangular receiver optics aperture, particularly of about 25×30 mm.

In one embodiment, the device comprises at least two laser sources, particularly comprising a fibre splitter.

In one embodiment, the device has a horizontal field of view of at least 70°, in particular at least 80°.

In one embodiment, the device has an instantaneous vertical field of view of at least ±3°, in particular at least ±5°.

In one embodiment, the device has a scan resolution of at least one point per 0.5° in horizontal and vertical direction, in particular one point per 0.3°.

In one embodiment, the device has a frame rate of at least 20 Hz, particularly at least 25 Hz, for scanning at least the entire horizontal and instantaneous vertical field of view with said scan resolution.

BRIEF DESCRIPTION OF THE DRAWINGS

The invention in the following will be described in detail by referring to exemplary embodiments that are accompanied by figures, in which:

FIGS. 3a-b show the mechanical dimensions of the second embodiment;

FIG. 4 shows a non-uniform point distribution in horizontal direction for the second embodiment having an oscillating galvano mirror;

FIG. 5 shows a first exemplary solution path for the second embodiment;

FIG. 6 shows a second exemplary solution path for the second embodiment; and

FIG. 7 shows parameter values for an exemplary embodiment of the scanner according to the invention.

DETAILED DESCRIPTION

Figure 1:
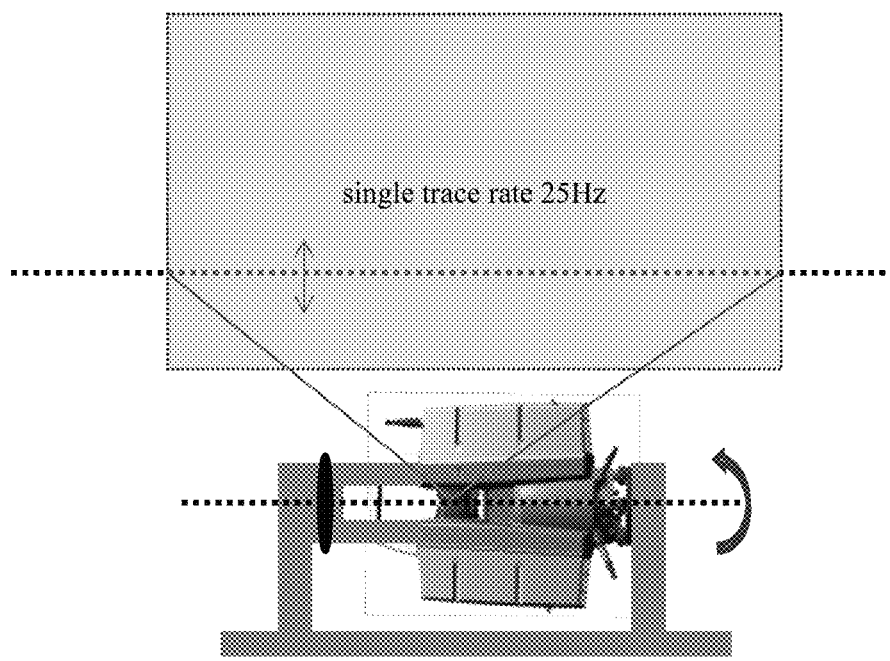
FIG. 1 shows a custom mechanical mount for horizontal laser scanner operation as a first exemplary embodiment of the scanner device according to the invention.

FIG. 1 shows a custom laser scanner (e. g. a Leica Geosystems ScanStation P40) mounted horizontally at a suitable height at the front of a car. This setup allows a qualitative analysis of range performance, accuracy, dynamic range (road-sign scans) and tarmac scans (low reflectivity at high ranges and low incident angles).

A full VFOV and HFOV scan for post-processing can be achieved with an angular resolution of 0.15° (vertical and horizontal). A customized mechanical mount for horizontal scanner applications could provide an evaluation platform to assess the LIDAR performance within a dynamic application. A fixed configuration for single trace scans and a rotatable configuration for full FOV scans with single traces are possible.

Figure 2A:
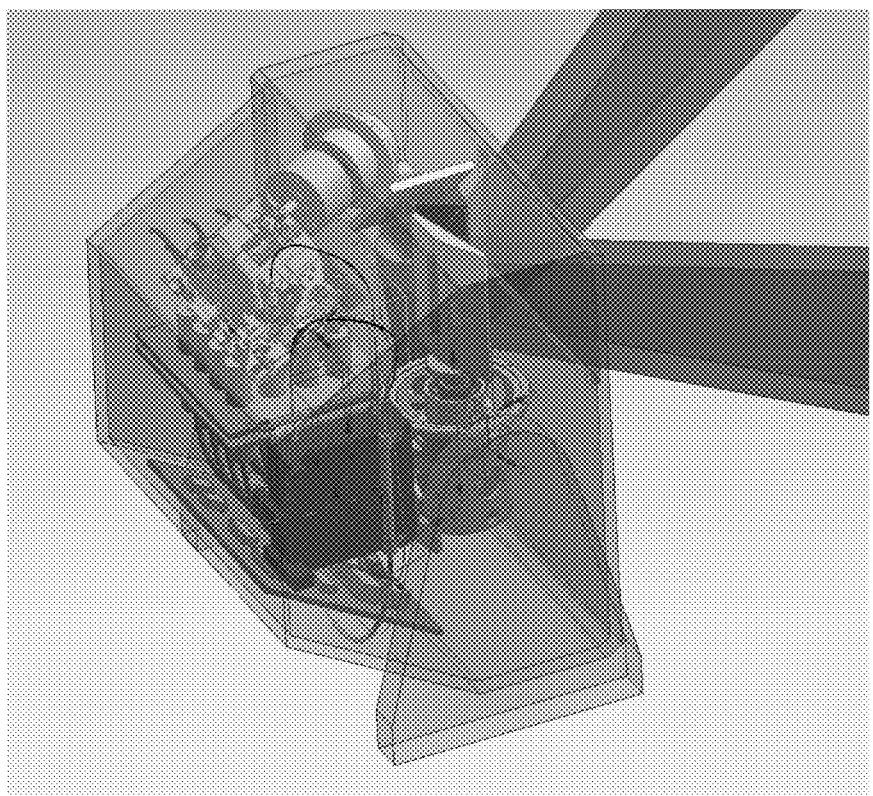
FIGS. 2a-c show a second exemplary embodiment of the scanner device according to the invention with its inside components.
Figure 2B:
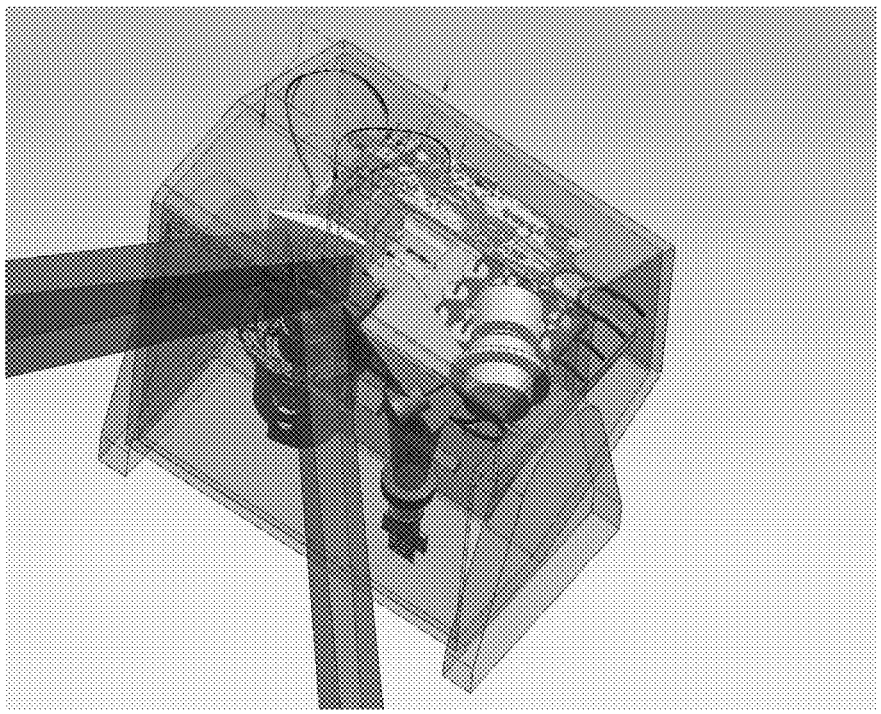
Figure 2C:
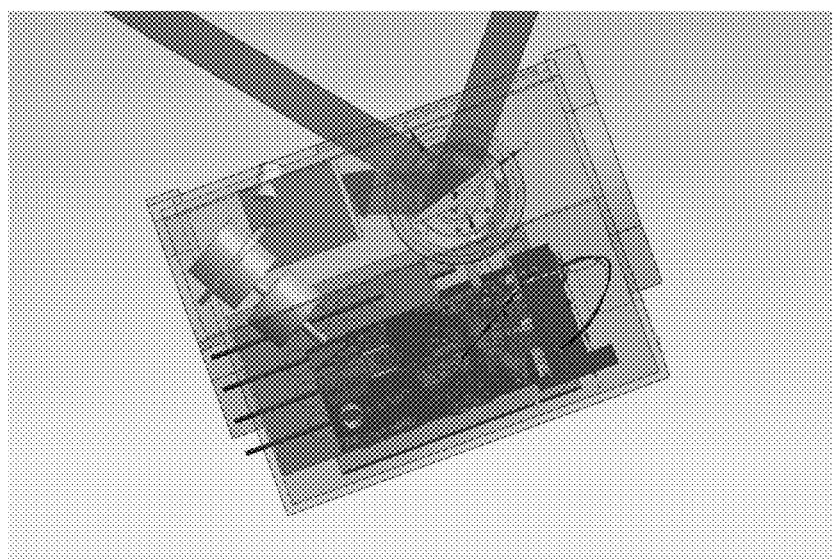

FIGS. 2a, 2b and 2c show a second exemplary embodiment of the laser scanner device according to the invention. In contrast to the solution shown in FIG. 1, this embodiment comprises a common and compact housing to house all beam steering elements. Conceptually, the shown embodiment is based on a fast rotating polygon wheel projecting the instantaneous Field of View (iVFOV), and either a fixed rotating mirror or a dynamically rotating galvano projecting the horizontal field of view (HFOV). FIGS. 3a and 3b show achievable advantageous dimensions of the device in mm.

FIG. 4 shows a non-uniform point distribution along the horizontal direction (HFOV) due to the galvano scan mechanism. The iVFOV and VFOV scan patterns remain uniform. From an application point of view the non-uniform point density towards the edge of the window provides following advantages:

1. Increased projected point pattern for objects seen under a low angle of incidence, e. g. buildings along the road; and
2. Increased information density, e. g. detection of objects accidentally crossing a street.

FIGS. 5 and 6 each show a morphological analysis of technologies that can be used to constitute a device according to the second embodiment. Advantageous examples are indicated by bold type.

FIG. 7 shows parameter values for an exemplary embodiment of the scanner according to the invention.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A laser scanner device adapted to be mounted to a vehicle, the laser scanner device comprising:
    a LIDAR module comprising at least one laser source, the laser scanner device having:
        a horizontal field of view of at least 60°,
        an instantaneous vertical field of view of at least ±2°,
        a scan resolution of at least one point per 0.8° in a horizontal and a vertical direction, and
        a frame rate of at least 10 Hz for scanning at least the entire horizontal and instantaneous vertical field of view with said scan resolution,
    wherein the laser scanner device further comprises:
        a galvano mirror which steers a scanning beam horizontally in a non-uniform manner,
        a polygon which steers the scanning beam vertically in the instantaneous vertical field of view,
        a fixed receiver having at least 32 detectors,
        a rectangular receiver optics aperture, and
        a tilt mechanism for tilting the device to achieve an overall vertical field of view of at least ±25°.

2. The laser scanner device according to claim 1, wherein the fixed receiver has at least 64 detectors.

3. The laser scanner device according to claim 1, wherein the LIDAR module has:
    a uniform scan resolution of at least 0.15°.

4. The laser scanner device according to claim 1, wherein the LIDAR module has:
    a non-uniform scan resolution of between 0.15° and 0.3°, and
    wherein a point density of the non-uniform scan increases towards the edges of the field of view.

5. The laser scanner device according to claim 1, further comprising:
    a housing which encompasses the at least one laser module.

6. The laser scanner device according to claim 1, further comprising:
    a rectangular receiver optics aperture of about 25×30 mm.

7. The laser scanner device according to claim 1, further comprising:
    at least two laser sources.

8. The laser scanner device according to claim 1, wherein the LIDAR module has:
    a horizontal field of view of at least 70°.

9. The laser scanner device according to claim 1, wherein the LIDAR module has:
    an instantaneous vertical field of view of at least ±3°.

10. The laser scanner device according to claim 1, wherein the LIDAR module has:
    a scan resolution of at least one point per 0.5° in horizontal and vertical direction.

11. The laser scanner device according to claim 1, wherein the LIDAR module has:
    a frame rate of at least 20 Hz for scanning at least the entire horizontal and instantaneous vertical field of view with said scan resolution.

12. The laser scanner device according to claim 1, wherein the LIDAR module works based on emitted laser pulses and time-of-flight-measurement-principle.

13. The laser scanner device according to claim 1, wherein the LIDAR module works using waveform digitizing.

* * * * *